United States Patent
Terry

(10) Patent No.: US 12,005,827 B2
(45) Date of Patent: Jun. 11, 2024

(54) BUS OR TRAILER WITH GAMING APPARATUSES INSTALLED THEREON

(71) Applicant: Tiffany Terry, Hapeville, GA (US)

(72) Inventor: Tiffany Terry, Hapeville, GA (US)

(*) Notice: Subject to any disclaimer, the term of this patent is extended or adjusted under 35 U.S.C. 154(b) by 0 days.

(21) Appl. No.: 17/246,925

(22) Filed: May 3, 2021

(65) Prior Publication Data

US 2021/0347289 A1 Nov. 11, 2021

Related U.S. Application Data

(60) Provisional application No. 63/021,415, filed on May 7, 2020.

(51) Int. Cl.
| | |
|---|---|
| *B60P 3/025* | (2006.01) |
| *B62D 31/02* | (2006.01) |
| *B62D 53/04* | (2006.01) |
| *G07F 17/32* | (2006.01) |

(52) U.S. Cl.
CPC ............ *B60P 3/025* (2013.01); *B62D 31/02* (2013.01); *B62D 53/04* (2013.01); *G07F 17/3218* (2013.01)

(58) Field of Classification Search
CPC ...................................................... A63D 1/02
See application file for complete search history.

(56) References Cited

U.S. PATENT DOCUMENTS

| | | | | |
|---|---|---|---|---|
| 3,572,717 | A * | 3/1971 | Anguella | A63F 7/0017 273/126 R |
| 3,599,977 | A * | 8/1971 | Glass | A63F 9/0204 273/281 |
| 5,639,141 | A | 6/1997 | Hanemaayer | |
| 6,616,535 | B1 * | 9/2003 | Nishizaki | G07F 17/3234 463/43 |
| D712,979 | S * | 9/2014 | Cohen | A63F 5/00 D21/397 |
| 8,864,206 | B2 | 10/2014 | Miller et al. | |
| 9,815,388 | B1 | 11/2017 | Lindsay | |
| 10,507,755 | B1 | 12/2019 | Clark et al. | |
| 2009/0029774 | A1 * | 1/2009 | Novis | A63F 13/27 463/42 |
| 2010/0171350 | A1 | 7/2010 | Large et al. | |
| 2011/0204756 | A1 * | 8/2011 | DeMars | A47F 9/00 312/258 |
| 2020/0155922 | A1 * | 5/2020 | Hall | A63F 1/12 |
| 2022/0054931 | A1 * | 2/2022 | Chapman | A63D 1/02 |

OTHER PUBLICATIONS

Teague, Chris, Someone Turned a School Bus Into This Surprisingly Excellent $50,000 Pirate Ship. [online], Jun. 2020 [retrieved on Nov. 5, 2022]. Retrieved from the Internet:< URL: https://web.archive.org/web/20200828155611/https://www.thedrive.com/news/33795/someone-turned-a-school-bus-into-this-surprisingly-excell.* [Item U continued] ent-50000-pirate-ship>. (Year: 2020).*

\* cited by examiner

*Primary Examiner* — Robert T Clarke, Jr.
(74) *Attorney, Agent, or Firm* — Daniel Boudwin

(57) ABSTRACT

A bus or trailer with gaming apparatuses installed thereon is shown and described. The bus or trailer with gaming apparatuses installed thereon includes a bus or trailer comprised of at least a compartment having a plurality of sidewalls and at least one door. The compartment is secured to a movable apparatus. A plurality of gaming apparatus is installed around an interior of the compartment. The interior includes at least one sleeper bed, at least one electronic gaming machine, and at least one gaming table.

5 Claims, 4 Drawing Sheets

BUS OR TRAILER WITH GAMING APPARATUSES INSTALLED THEREON

CROSS REFERENCE TO RELATED APPLICATIONS

This application claims the benefit of U.S. Provisional Application No. 63/021,415 filed on May 7, 2020. The above identified patent application is herein incorporated by reference in its entirety to provide continuity of disclosure.

BACKGROUND OF THE INVENTION

The present invention relates to mobile entertainment. More particularly, the present invention provides a bus or trailer with entertainment devices located thereon Many individuals enjoy taking part in various games and recreational activities. In some instances, these activities include items found in casinos or other establishments. This means that in many cases these activities are limited to large or specialized establishments. In some instances, it can be difficult to reach such establishments.

In other instances, individuals are looking for new and unique party themes or gatherings. These may be difficult to afford as currently, this may require a large amount of preparation and set up. In other instances, these items require a specialized location where they may be set up. In other situations, a license may need to be granted for items such as a gambling establishment.

Consequently, there is a need for an improvement in the art of mobile entertainment. The present invention substantially diverges in design elements from the known art while at the same time solves a problem many people face when searching for mobile entertainment. In this regard the present invention substantially fulfills these needs.

SUMMARY OF THE INVENTION

The present invention provides a bus or trailer with gaming apparatuses installed thereon wherein the same can be utilized for providing convenience for the user when wanting to have a unique experience or an experience that requires a specialized location. The bus or trailer with gaming apparatuses installed thereon is comprised of a bus or trailer comprised of at least a compartment having a plurality of sidewalls and at least one door. The compartment is secured to a movable apparatus. A plurality of gaming apparatus installed around the interior of the bus. The interior of the vehicle can include tables, chairs, and the like that are secured in place but can be rearranged to have different configurations as the user desires.

Another object of the bus or trailer with gaming apparatuses is to include a bar located in one section of the bus.

A further object of the bus or trailer with gaming apparatuses is to include at least one bowling lane.

Yet another object of the bus or trailer with gaming apparatuses is to include a roulette table.

Another object of the bus or trailer with gaming apparatuses is to include a blackjack table.

A further object of the bus or trailer with gaming apparatuses is to include a tic-tac-toe board.

Still another object of the bus or trailer with gaming apparatuses is to include a shuffleboard.

Another object of the bus or trailer with gaming apparatuses is to include a plurality of gaming apparatuses which use tokens.

A further object of the bus or trailer with gaming apparatuses is to include a plurality of gaming apparatuses which use tokens added to or subtracted from a readable card.

Other objects, features and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
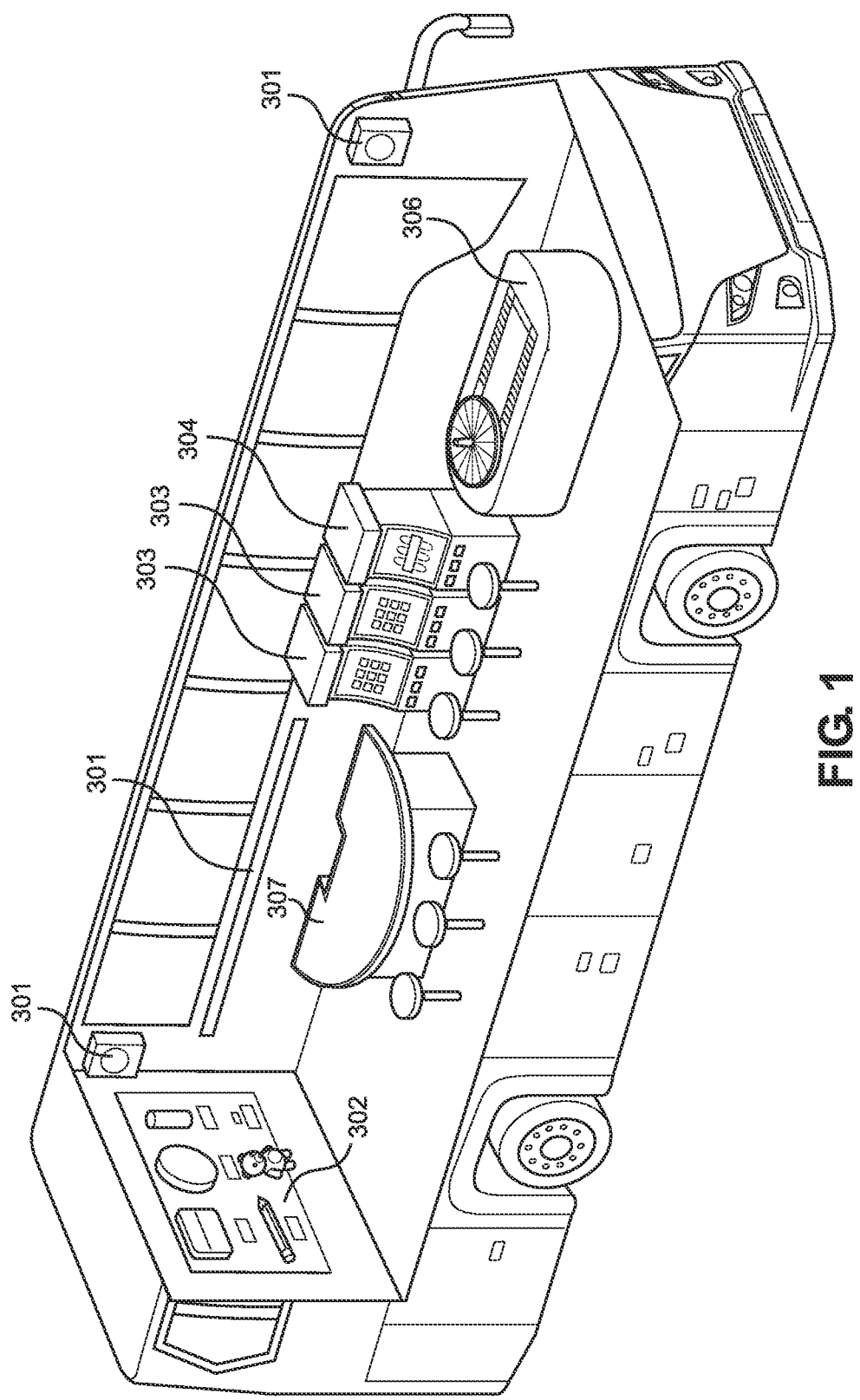
FIG. 1 shows a perspective view of a bus embodiment of the present invention showing different arrangements of casino games.

Reference is made herein to the attached drawings. Like reference numerals are used throughout the drawings to depict like or similar elements of the bus or trailer with gaming apparatuses installed thereon. For the purposes of presenting a brief and clear description of the present invention, a preferred embodiment will be discussed as used for the bus or trailer with gaming apparatuses installed thereon. The figures are intended for representative purposes only and should not be considered to be limiting in any respect.

Referring now to FIG. 1, there is shown a perspective view of a bus embodiment of the present invention showing different arrangements of casino games. In one embodiment, the invention is embodied in a tour bus or other similar vehicle. The vehicles can have various exterior designs as desired. For example, in one embodiment, the vehicle may include casino imagery on the exterior, or may be designed to look like a cruise ship.

The vehicle will have all of the necessary items needed to drive on land. The vehicle will include tires and an engine. The vehicle will further include steering devices and the necessary features to move a motor vehicle. There is further at least one door to enter and exit the vehicle.

In one embodiment, the casino themed vehicle includes various lights and sound systems 301. In one embodiment, the casino vehicle includes a power generator to power the various casino games. In yet a further embodiment, the casino includes a prize wall 302. In this embodiment, the casino games are played for tokens, tickets, or fake money. These winnings can then be traded for prizes. In another embodiment, the casino vehicle is a real casino played for real money.

In one embodiment, the casino vehicle includes at least one slot machine 303. In other embodiments, numerous slot machines 303 are included. In yet further embodiments, video poker games 304 are included on the vehicle. In other embodiments, further electronic casino games are included.

Figure 3:
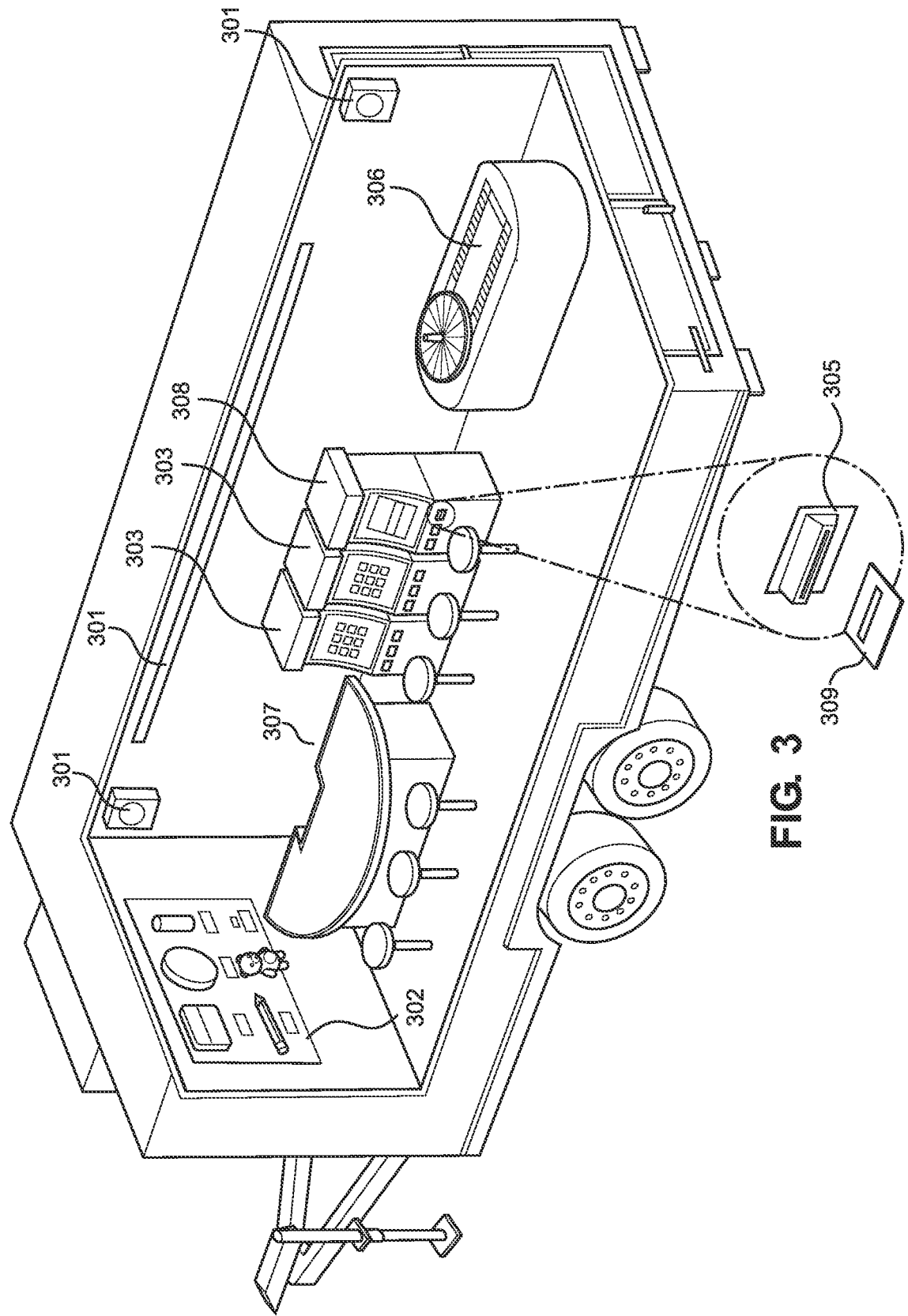
FIG. 3 shows a perspective view of a trailer embodiment of the present invention showing different arrangements of casino games.

In various embodiments, the electronic gaming systems accept money or tokens. In another embodiment, the electronic gaming systems use a card reader 305. In one embodiment, playing currency is loaded onto a readable card 309, which is provided for each player. The card is swiped in the card reader 305, and playing currency stored on the card is accepted by the gaming device. The device will interact with the readable card to take currency from the card and deposit winnings back to the card. An example of a card reader is shown in FIG. 3.

In another embodiment, the casino vehicle includes various table games. In one embodiment, the casino vehicle includes at least one roulette table 306. In another embodiment, the casino vehicle includes a blackjack table 307. In a further embodiment, the casino vehicle includes a poker table to allow for tournaments.

The various tables, chairs, and other elements of the vehicle interior can be repositioned by the user. There can be various fasteners including latches or other securement devices for removably securing these elements. Common mounting points can be disposed throughout the interior surfaces of the vehicle. For example, the user can arrange one side of the vehicle to include gaming tables, one end to include the slot machines, and another location to include other amenities. This allows the user to customize the interior layout of the vehicle for different aesthetics. In one embodiment, the interior layout also includes sleeper beds to allow occupants to lie down if they so desire.

Figure 2:
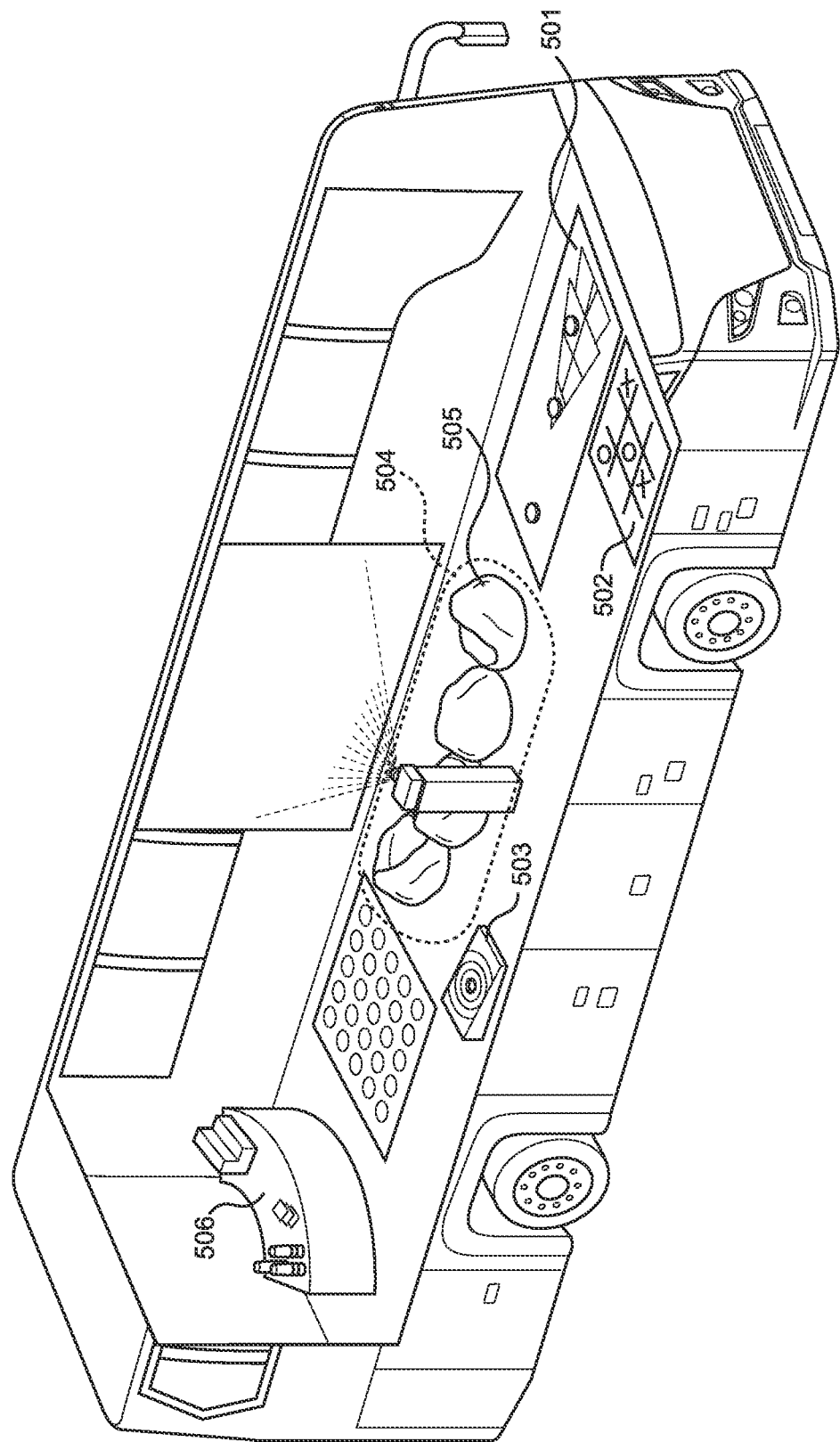
FIG. 2 shows a perspective view of an alternate bus embodiment of the present invention showing alternate arrangements of different game elements.

Referring now to FIG. 2, there is shown a perspective view of an alternate bus embodiment of the present invention showing alternate arrangements of different game elements. In the shown embodiment, the vehicle includes a tic tac toe board 502, a shuffle board 501, and a toss game target 503, all of which can be repositioned as desired. A seating area 504 includes adjustable seats 505. In the shown embodiment, one of the walls of the vehicle includes a display area for display images from one or more projectors. This allows advertisements or entertaining images to be displayed. Further, the interior can include a bar 506 or other point-of-sale structure that allows users to purchase items such as drinks or the like.

Figure 4:
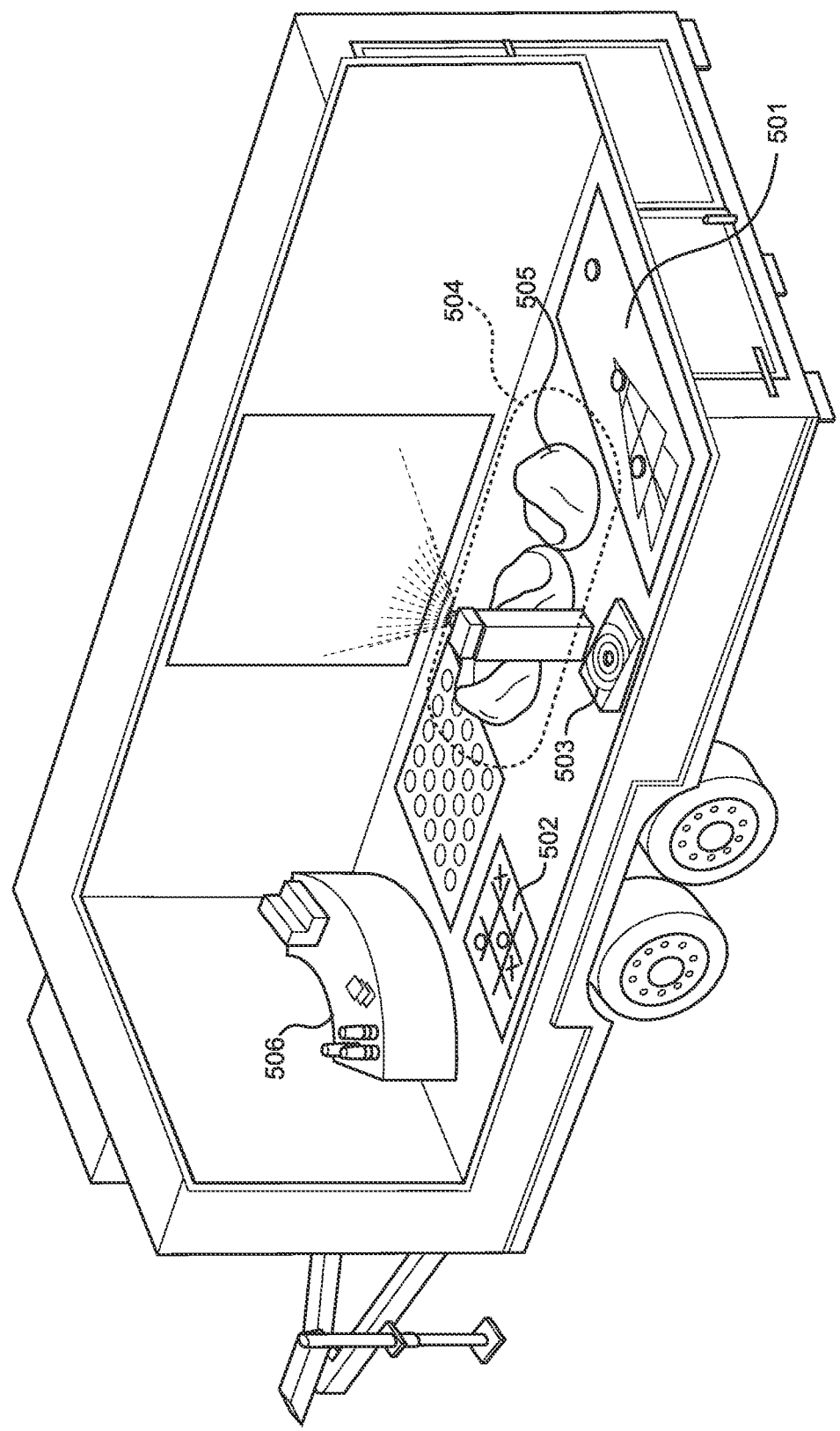
FIG. 4 shows a perspective view of an alternate trailer embodiment of the present invention showing alternate arrangements of different game elements.

Referring now to FIGS. 3 and 4, there are shown a perspective views of trailer embodiments of the present invention showing different arrangements of casino games. The present invention can be embodiment in a powered vehicle such as a bus or an unpowered, towed vehicle such as a trailer, which includes hitch for being towed by a vehicle. The trailer hitch is connected to a frame. The frame further has a plurality of wheels rotatably coupled thereto. The frame and wheels will support the trailer body. The trailer body is comprised of a plurality of sidewalls. In one embodiment there is at least one door located through the plurality of sidewalls. This will allow entrance into the trailer.

In one embodiment, the bus or trailer is set with various additional games. In one embodiment, a shuffleboard court 501 is placed on the vehicle. In one embodiment, only half of a shuffleboard court 501 is placed on the vehicle. This will allow for additional room to be used for other games. In one embodiment, a Tic-Tac-Toe game 502 is placed on the vehicle. In one embodiment, the Tic-Tac-Toe game 502 is a at least 9 square feet. In other embodiments, the TIC-TAC-TOE game 502 is of any other desired size. In one embodiment, the Tic-Tac-Toe game 502 includes reusable pieces.

The pieces are removably placed onto the board during play. This means that there are a plurality of each X's and O's that go with the game.

In one embodiment, the vehicle further includes at least one bean bag game 503. In one embodiment, a bean bag game 503 is corn hole. In this embodiment, the corn hole boards are placed on the vehicle opposing each other. In another embodiment, there is a single corn hole board. This will save space and allow for other games.

In one embodiment, the vehicle further includes a seating area 504. In one embodiment, the seating area 504 includes bean bag chairs 505. In another embodiment, the seating area 504 includes other chairs. In yet a further embodiment, the seating area 504 includes tables. This will allow people to place food or beverage on the tables while playing games.

In one embodiment, there is a snack bar 506 located on the vehicle. In one embodiment, the snack bar 506 contains various snacks and drinks. In a further embodiment, the snack bar 506 includes a grill to cook various foods. In yet a further embodiment, the snack bar 506 includes various drink taps. In one embodiment, the drink taps can dispense beers or other alcoholic beverages.

In different embodiments, some aspects of the different embodiments are mixed together on the bus or trailer. In different embodiments, a bar is included in the different embodiments. In yet other embodiments, there are speakers and sound systems added to the embodiments.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A bus consisting of:
   an engine which propels a plurality of wheels;
   a bus compartment which has a plurality of sidewalls and at least one door;
   a plurality of gaming apparatuses installed around an interior of the bus compartment, the gaming apparatuses are configured to be movably secured within the bus compartment;
   at least one seat removably secured and repositionable within the bus compartment;
   at least one table removably secured and repositionable within the bus compartment;
   further comprising a snack bar located in one section of the bus compartment;
   a seating area having a plurality of bean bag chairs;
   wherein the snack bar containing a plurality of snacks and drinks;

wherein the snack bar includes a grill to cook a plurality of foods;
wherein the snack bar includes a plurality of drink taps that dispense a plurality of beers and a plurality of other alcoholic beverages;
wherein the gaming apparatuses includes at least one bowling lane;
wherein the gaming apparatuses includes a roulette table;
wherein the gaming apparatuses includes a blackjack table;
wherein the gaming apparatuses includes a tic-tac-toe board; and
wherein the gaming apparatuses includes a shuffleboard court.

2. The bus with gaming apparatuses of claim 1, wherein each of the gaming apparatuses uses one or more tokens.

3. The bus with gaming apparatuses of claim 2, wherein each of the gaming apparatuses uses one or more tokens added to or subtracted from a readable card.

4. The bus with gaming apparatuses of claim 1, wherein the exterior of the bus is designed to look like a ship.

5. A trailer consisting of:
a vehicle hitch connected to a frame;
a plurality of wheels rotatably coupled to the frame and a trailer compartment which has a plurality of sidewalls and at least one door secured to a top of the frame;
a plurality of gaming apparatuses installed around an interior of the trailer;
at least one seat removably secured and repositionable within the trailer interior;
at least one table removably secured and repositionable within the trailer interior;
further comprising a bar located in one section of the trailer;
wherein the gaming apparatuses includes at least one bowling lane;
wherein the gaming apparatuses includes a roulette table;
wherein the gaming apparatuses includes a blackjack table;
wherein the gaming apparatuses includes a Tic-Tac-Toe board;
wherein the gaming apparatuses includes a shuffleboard court, and wherein each of the gaming apparatuses uses tokens added to or subtracted from a readable card.

* * * * *